Patented Dec. 5, 1933

1,938,324

UNITED STATES PATENT OFFICE 1,938,324

PRODUCTION OF CYANOGEN CHLORIDE

Paul Dieterle, Buffalo, N. Y., assignor to National Aniline & Chemical Company, Inc., New York, N. Y., a corporation of New York No Drawing. Application March 14, 1927
Serial No. 175,419

8 Claims. (Cl. 23—14)

This invention relates to improvements in the production of cyanogen chloride, and particularly to the production of cyanogen chloride in the presence of an inert solvent.

It is well known that chlorine does not act, or acts very slowly, upon sodium cyanide under perfectly anhydrous conditions but that in the presence of a small quantity of water the reaction readily takes place and under suitable conditions of temperature and pressure cyanogen chloride is the chief product of the reaction.

It has been heretofore proposed to prepare cyanogen chloride by the action of moist chlorine upon sodium cyanide in the presence of carbon tetrachloride and of about two percent of water at a temperature of about 0° to 5° C., and subsequently removing the cyanogen chloride by the distillation of the mixture this produced.

The present invention is based on the discovery that glacial acetic acid is an excellent organic catalyst or reagent in promoting the reaction of chlorine on sodium cyanide in the presence of an inert solvent such as, for example, carbon tetrachloride. The reaction is readily controlled, and excellent yields and uniform results are obtained. Further, the carbon tetrachloride solution of cyanogen chloride thus prepared when treated with aniline produces excellent yields of diphenylguanidine of excellent quality.

The following example will further illustrate the invention, but it will be understood that the invention is not limited thereto. The parts are by weight.

*Example.*—In a vessel equipped with a reflux condenser, an agitator, and heating and cooling means, 50 parts of finely pulverized, dry sodium cyanide (96 to 98 percent purity) are suspended in about 300 parts of dry carbon tetrachloride to which about 2 parts of glacial acetic acid are added. The well agitated mixture is cooled to about +5° to —10° C., and then treated with a current of dry chlorine, the temperature of the reaction mixture being maintained around +5° to —10° C., preferably not above about 0° C. About 70 parts of chlorine, or substantially the theoretical quantity required to react with the sodium cyanide, are added. After all of the chlorine has been added, the mixture is stirred for an additional one-half hour or so, or until the reaction is complete. Excess of chlorine should be avoided.

In the above example, cyanogen chloride and sodium chloride are produced in the reaction, and the former dissolves in the carbon tetrachloride while the latter separates as an insoluble precipitate. From the mixture thus obtained, the cyanogen chloride may be removed, if desired, by careful distillation. The solution, however, with or without the removal of the sodium chloride, is particularly valuable for use in the preparation of an arylcyanamide, or of a substituted guanidine. By treating the solution, for example, at a relatively low temperature, say more or less around 0° to +10° C., with the amount of dry aniline, which may or may not be diluted by the previous addition of carbon tetrachloride, substantially required to combine with the cyanogen chloride to form phenylcyanamide and aniline hydrochloride, and subsequently heating the resulting mixture to boiling under a reflux condenser until the reaction is complete, there is produced diphenylguanidine hydrochloride from which the base, diphenylguanidine, can be obtained in any suitable manner in excellent yields and quality.

It will be readily understood that the invention is adapted to the preparation of cyanogen chloride solutions in other suitable solvents, preferably solvents immiscible with water, which are inert, or substantially so, toward the action of chlorine and of cyanogen chloride but in which cyanogen chloride is more or less readily soluble. In particular, certain halogen derivatives of the aliphatic series such as ethylene dichloride, trichlorethylene, tetrachlorethane, etc. are useful solvents. Liquid hydrocarbons such as benzene and the liquid halogen derivatives of benzene such as technical o-dichlorbenzene may also be used. In general, the resulting solution of cyanogen chloride in the organic solvent thus obtained is adapted for treatment with an organic amine for the production of a substituted cyanamide or of a substituted guanidine, particularly a diarylguanidine.

It will be further understood that other acids than glacial acetic acid can be used as the catalyst or promoter, for example, benzoic acid, chloracetic acid, each of which acids contains a carboxylic group etc. In general, organic acids soluble in the inert solvent, and preferably miscible with the inert solvent in all proportions, are to be employed. The amount of acid used as catalyst may vary over a considerable range, the amount employed being ordinarily about 2 to 8 percent, or preferably about 4 to 5 percent, of the weight of cyanide employed.

It is also obvious that the invention is applicable to the use of bromine (atomic number, 35) in place of chlorine (atomic number, 17) and to the use of other metal cyanides, or other alkali metal cyanide, in place of sodium cyanide.

It is to be understood that the invention is not limited to the use of the particular agents or ingredients mentioned in the example and that other agents of the class specified can be similarly employed.

I claim:

1. In the production of a cyanogen halide, the process which comprises reacting a halogen selected from the group consisting of chlorine and bromine with an alkali metal cyanide in the presence of an inert organic solvent and of an organic monocarboxylic acid soluble in said solvent, the reaction being carried out in the substantial absence of water.

2. In the production of cyanogen chloride, the process which comprises treating with chlorine an alkali metal cyanide in the presence of an inert organic solvent and of a small quantity of an organic monocarboxylic acid soluble in said solvent, the reaction being carried out in the substantial absence of water.

3. In the production of cyanogen chloride, the process which comprises treating an alkali metal cyanide with chlorine in the presence of an inert organic solvent and of an amount of an organic monocarboxylic acid equal to about 2 to 8 percent by weight of the alkali metal cyanide employed, said organic acid being soluble in said inert solvent, the reaction being carried out in the substantial absence of water.

4. The process of forming a solution of a cyanogen halide in an inert organic solvent which comprises reacting a halogen selected from the group consisting of chlorine and bromine with an alkali metal cyanide in the presence of the inert organic solvent and of acetic acid, the reaction being carried out in the substantial absence of water.

5. The process of forming a solution of a cyanogen halide in an inert organic solvent which comprises reacting a halogen selected from the group consisting of chlorine and bromine with an alkali metal cyanide in the presence of a halogenated aliphatic hydrocarbon and of an organic monocarboxylic acid soluble in said halogenated hydrocarbon, the reaction being carried out in the substantial absence of water.

6. The process of forming a solution of cyanogen chloride in an inert organic solvent which comprises reacting sodium cyanide with chlorine in the presence of a halogenated aliphatic hydrocarbon and of acetic acid, the reaction being carried out in the substantial absence of water.

7. In the production of a cyanogen chloride solution in carbon tetrachloride, the process which comprises treating sodium cyanide with chlorine in the presence of carbon tetrachloride and of a small amount of glacial acetic acid at a maintained temperature of about $+5°$ to $-10°$ C., the reaction being carried out in the substantial absence of water.

8. In the production of a carbon tetrachloride solution of cyanogen chloride, the improvement which comprises treating sodium cyanide with chlorine in the presence of carbon tetrachloride and of an amount of glacial acetic acid equal to about four percent by weight of the sodium cyanide employed, the reaction being carried out in the substantial absence of water.

PAUL DIETERLE.